United States Patent [19]

Gray

[11] 3,930,581

[45] Jan. 6, 1976

[54] SHEET FEEDING MECHANISMS

[75] Inventor: Colin Gray, Watford, England

[73] Assignee: Crosfield Business Machines Limited, Watford, England

[22] Filed: Jan. 21, 1975

[21] Appl. No.: 542,829

[30] Foreign Application Priority Data

Jan. 23, 1974 United Kingdom ................ 3184/74

[52] U.S. Cl. .................... 209/73; 209/74; 271/173; 235/92 SB; 209/DIG. 2; 93/93 C

[51] Int. Cl.$^2$ ........................................ G06F 7/38

[58] Field of Search ............ 209/73, 74, 75, DIG. 2; 271/173, 65; 93/93 C; 270/58-60; 235/61.11 K, 92 SB

[56] References Cited

UNITED STATES PATENTS

| | | | |
|---|---|---|---|
| 1,839,973 | 1/1932 | Lard | 235/92 SB |
| 2,429,159 | 10/1947 | Hayes | 235/92 SB |
| 2,827,167 | 3/1958 | Joseph et al. | 235/61.11 K |
| 3,412,993 | 11/1968 | Giori | 235/92 SB |
| 3,582,618 | 6/1971 | Bergman | 235/92 SB |

*Primary Examiner*—Allen N. Knowles
*Attorney, Agent, or Firm*—Kemon, Palmer & Estabrook

[57] ABSTRACT

A sheet feeding mechanism is described in which the sheets in a batch of sheets are sorted into different output stackers. The sheet feeding mechanism includes a buffer store for receiving and temporarily holding a batch of sheets while a predetermined batch value is verified, and a batch verifier responsive to the passage of each sheet along a given path for comparing a measured batch value with a reference value to derive an error signal. The sheets are extracted from the store one by one and a sheet sorting mechanism sorts the sheets into different output stackers. The sorting mechanism includes means responsive to the output of the verifier for segregating the sheets of the batch extracted from the store whenever the error exceeds a predetermined value.

9 Claims, 5 Drawing Figures

SHEET FEEDING MECHANISMS

Used banknotes received by a depositing bank are generally made up into batches and each batch is bundled with an identifying band. The bundles are often then passed to a central bank which confirms certain batch values, such as the number of notes in each bundle or the total monetary value of a batch having notes of mixed denomination, and sorts out forged or incorrect notes before notifying the depositing bank of any errors in the batch values. At the same time it may sort out damaged notes which are unfit for recirculation.

Machines for mechanising the process of counting and sorting have already been proposed in which the notes from each batch are sorted into different output stackers at the same time as they are counted. This means that if there is an error in the number of notes in a particular batch, these notes must be identified and retrieved from the output stackers. This is undesirable because it means that in the output stackers the notes of a particular batch must be kept separable from the notes of the preceding batch at least until the input count has been verified. There is also a loss in throughput unless a very complicated design is used which enables the machine to continue feeding notes while the notes of the defective batch are retrieved from the output stackers. A further disadvantage is that such a system requires access to the output stackers and this is generally undesirable for banking security. The notes in each output stacker should preferably be wrapped in bundles of, say, one hundred before access to the notes is permitted.

In accordance with the present invention a sheet feeding mechanism in which the sheets in a batch of sheets are to be sorted into different output stackers, includes: means for advancing the sheets along a given path, a buffer store for receiving and temporarily holding the sheets fed along the path while a predetermined batch value is verified, a batch verifier responsive to the passage of each sheet along the path for comparing a measured batch value with a reference value to derive an error signal, means for extracting the sheets one by one from the store, and a sheet sorting mechanism for sorting the sheets extracted from the store into different output stackers, the sorting mechanism including means responsive to the output of the verifier for segregating the sheets of a batch extracted from the store whenever the error exceeds a predetermined value.

Thus, where the batch value represents the number of sheets in a batch, and the number of sheets in a batch differs from the fixed reference value, there is an error output from the verifier which ensures that the sheets of the deficient batch are out-stacked in a separate stacker without disturbing the general flow of sheets to the output stackers.

The sheets, or at least the leading edges of the sheets, are preferably maintained apart from one another while being progressively advanced through the store during the verification. Thus the sheets can be withdrawn from the store one by one without having to separate the sheets from a stack, and this is particularly advantageous when the sheets comprise banknotes which are subsequently advanced longitudinally, i.e., with their short edges leading, to facilitate machine reading of the serial numbers on the notes.

The batches may be fed separately so that the verifier is reset manually after each batch value has been verified, or the movement of the first and last sheets of each batch into the store may be signalled to the verifier automatically, for example using feedable header and/or trailer sheets. Thus the capacity of the store must always be at least equal to the number of sheets in a batch and should preferably include additional capacity to accommodate header and/or trailer sheets.

In one embodiment of the invention the buffer store comprises a drum having radially extending pockets into which the sheets are inserted one by one as the pockets move through an input station. The sheets are then held in the pockets while being transferred from the input station to an output station by rotation of the drum. The number of pockets and the speed of rotation are chosen so that the first sheet of a batch will not have reached the output station before the last sheet of the batch has been inserted into the store (or has at least passed a sensing point associated with the batch verifier).

In another embodiment the sheets are superimposed on one another in a partially overlapping formation during their passage through the store. The leading edge of each sheet is then extracted from the store at a speed greater than the speed at which the sheets are advanced through the store so that extraction of the first sheet does not interfere with extraction of the second sheet, and so on.

For sheets where the two faces of each sheet carry different markings, such as bank notes, the sheets fed out from the buffer store may be automatically arranged so that they face in the same direction before they are fed to the sorting mechanism. This is known as "facing" the sheets, and in accordance with a further aspect of the invention, a facer for facing the sheets fed out from the buffer store includes first and second sheet advancing means which, when energised, move a sheet along first and second paths respectively, the first path but not the second path reversing the direction in which the sheet is facing and the two paths subsequently reuniting with one another, means for bringing each sheet in turn into a position where one end of the sheet is in engagement with the first sheet advancing means and the opposite end of the sheet is in engagement with the second sheet advancing means, and means responsive to a signal indicating the direction in which the sheet is facing for energising either the first or the second sheet advancing means such that only those sheets facing in the wrong direction are fed along the first path.

In order that the invention may be more clearly understood, some examples of a sheet feeding mechanism embodying the invention will now be described with reference to the accompanying drawings in which.

Figure 1:
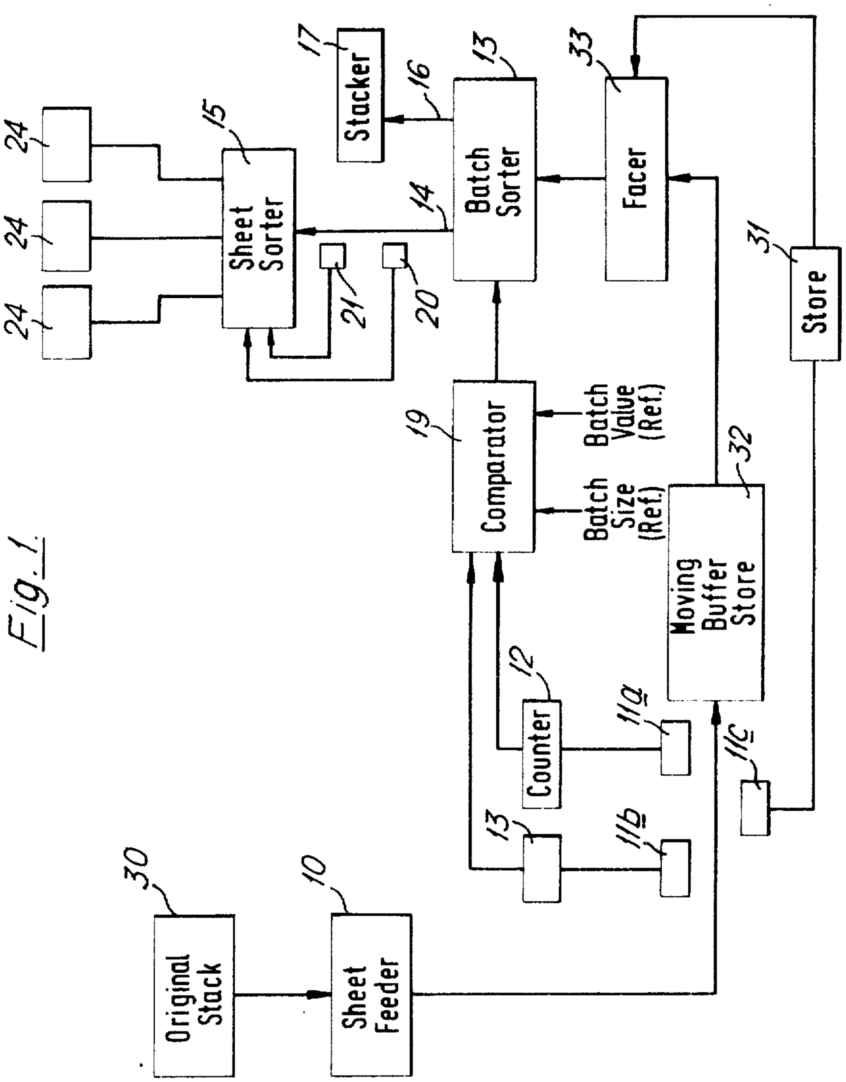
FIG. 1 is a flow diagram of a sheet feeding mechanism for counting and sorting batches of banknotes.

Referring first to FIG. 1, notes from a stack 30 of banknotes are fed individually long edge foremost into a moving buffer store 32. The sheet feeder 10 may be, for example, of the type described in our British Pat. No. 938,212.

Before entering the buffer store the notes move past one or more sensor heads 11. The head 11*a* merely detects each note and feeds a corresponding pulse to a counter 12. The head 11*b* reads information from the note (such as its monetary value) and the resulting pulses are fed to a decoder 13. The head 11*c* detects particular markings on the face of the note and feeds a signal indicating the direction in which the note is facing to a shift register 31.

After a complete batch of notes has been fed to the store 32, a comparator 19 compares the measured batch values (that is the number of notes in each batch represented by the output from counter 12 and the total monetary value of each batch represented by the output of detector 13) with predetermined reference values. The resulting error signal is fed to a batch sorter 13, while the notes fed out from the buffer store are passed through a facer 33 (illustrated in FIG. 5) before being fed to the sorter 13 which directs each batch either along a path 14 to a sheet sorter 15 or along a path 16 to an outstacker 17. A batch is fed along path 16 only in response to an error signal from comparator 19 indicating that the number of notes in a given batch and/or the monetary value for that batch has or have fallen below or exceeded the predetermined reference value. Other batch values may be verified in a similar manner.

A major advantage of this arrangement is that the notes of a deficient batch are automatically segregated from the notes of the acceptable batches before the notes are subsequently distributed into different stackers and without disturbing the flow of notes through the store 13.

Before passing into the sheet sorter 15 the notes pass further detector and read heads which determine the general condition and authenticity of each note. The output signals from these heads 20, 21 control the sorter 15 so that the notes are distributed into the appropriate output stackers 24.

The sorters 13 and 15, the output stackers 24 and 17, and the heads 20 and 21 may form part of a conventional sheet sorting/transport mechanism such as the Crosfield 9300. In this machine document transportation is by means of vacuum through rotating drums and the routing of documents is achieved by selectively switching the vacuum from one drum to another until the document finally arrives at its destination. The selective switching is controlled by electronic logic and, in the present example, the electronic logic would include means responsive to the output signal from the comparator 19 for routing notes of a deficient batch along the path 16 so that the notes would be segregated in the output stacker 17. Basically, each stacker assembly consists of a stop plate and a vertical, stainless steel, receiving plate which is attached to a horizontal, spring loaded, stacker rod, and is held against a stripper bar, whilst the stacker is vacant. As documents arrive, they are stripped off the stacker drum and are guided between the receiving plate and stripper to be stacked against the stop plate.

Figure 2:
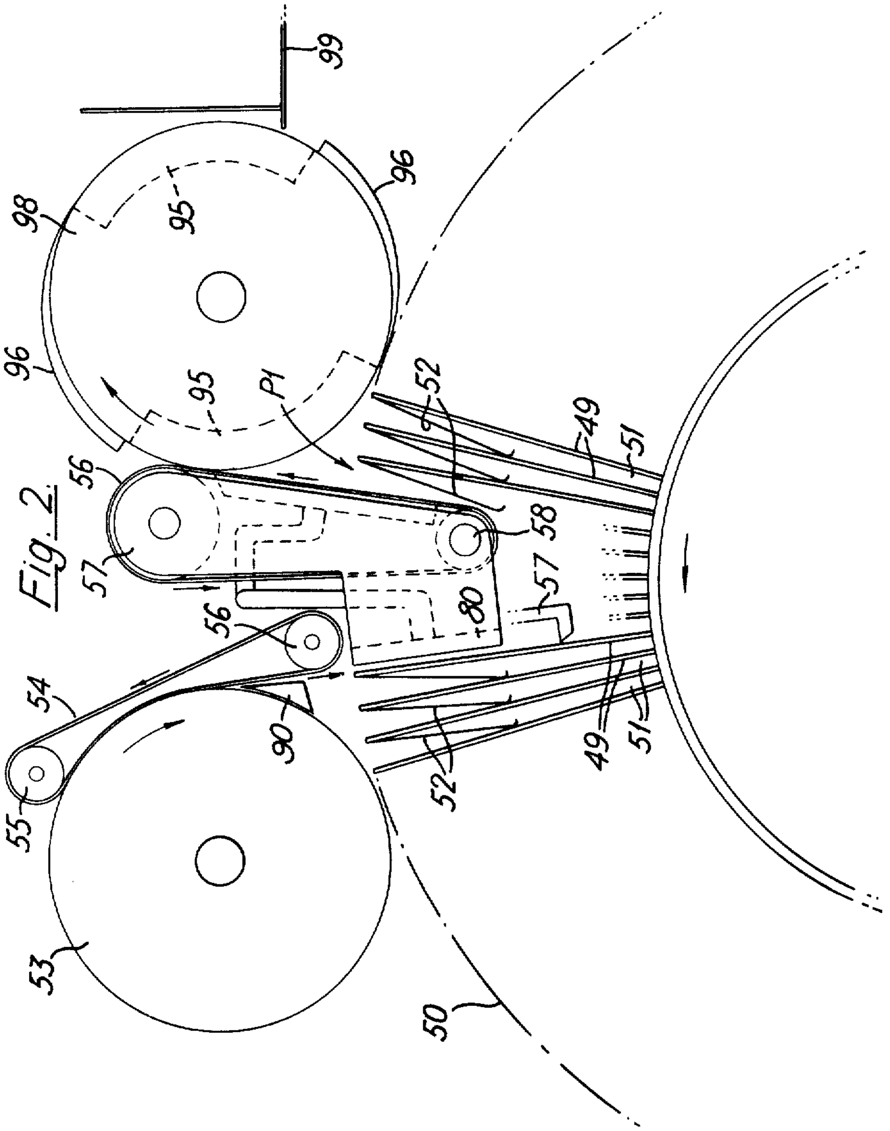
FIG. 2 is a schematic side elevational view illustrating one form of moving buffer store for use in the system of FIG. 1.

The buffer store illustrated in FIG. 2 consists essentially of a rotatable drum 50 having 125 radially extending pockets 51. Each pocket can store a single banknote which is retained by a light spring 52. The drum 50 is rotated at a speed which matches the frequency with which notes are delivered to the drum so that each successive pocket receives one note until the complete batch has been fed into the store.

The notes are fed into the store one by one by means of a drum 53 and an endless belt 54 which passes around pulleys 55 and 56 are bears against a portion of the drum 53. The drum 53 rotates in the direction shown by the arrow and the notes are stripped from the surface of the drum by a stripper device 90. The notes emerge tangentially to the drum 53 with their short edges leading, and are then delivered into one of the pockets. Each of the opposing pocket walls 49 is divided into two equal portions. An adjustable stop 57 is aligned with the gap between these two portions and limits the extent to which each note is allowed to enter into the pocket so that the top of each note is positioned just below the top of each pocket. A vacuum brake 80 prevents the notes striking the stop 57 with too great a force.

When the pocket containing the first note of a given batch reaches the position P1, the central portion of the note is picked up by a vacuum belt 56 which passes around pulleys 57 and 58. The belt 56 is moving at a speed which ensures that the trailing edge of the first note will have passed out of the pocket before the second note moves into engagement with the belt 56. The first note is thus advanced into the nip between the belt 56 and a vacuum drum 98 rotating at the same speed as the input drum 53, and the drum 98 then continues to transport the note around its periphery. The drum 98 includes a pair of raised nudging fingers 96 separated by vacuum-applying portions 95. Each note is released from drum 98 when it reaches a stop plate 99 and one of the nudging fingers 96 then urges the note against a vacuum pad 74 (FIG. 5) of the facer 33 (FIG. 1).

Figure 3:
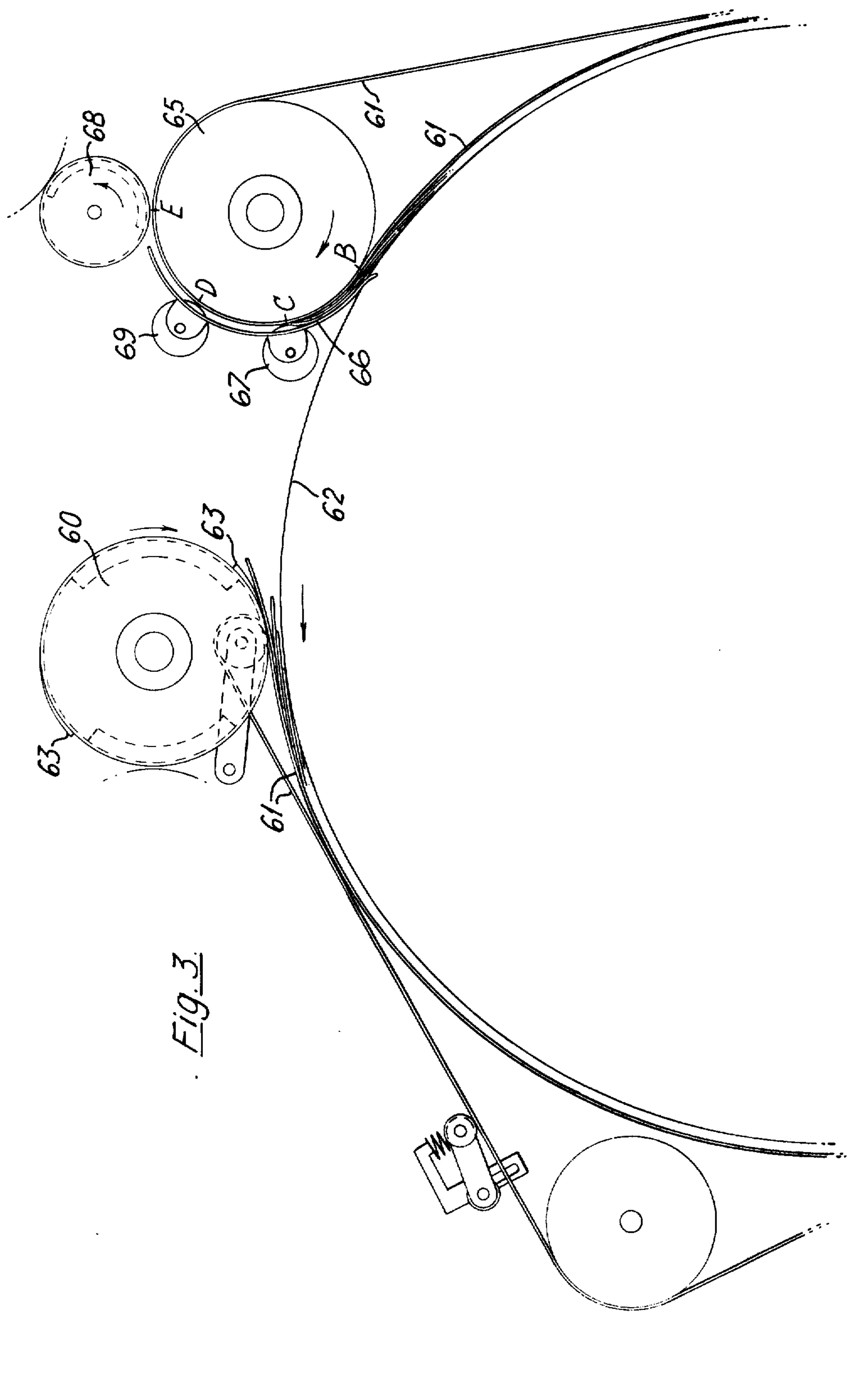
FIG. 3 is a schematic side elevational view of an alternative store for use in the system of FIG. 1.

In the alternative buffer store illustrated in FIG. 3, the notes are passed around a vacuum drum 60 and fed between the surface of an endless belt 61 and the periphery of a drum 62. The notes are layered on the drum one behind the other and partially overlapping one another.

The surface of the drum 60 includes a pair of raised nudging fingers 63 which are positioned between the two vacuum portions of the drum. As each note enters the nip between the belt 61 and the surface of drum 62, further rotation of drum 60 brings one of the nudging fingers into engagement with the trailing edge of the note to ensure that the trailing edge is urged out of the path of the leading edge of the next note to enter the nip.

The layered notes then travel almost the full circumference of the drum 62 held between the facing surfaces of the drum and the belt. The belt 61 then passes around a further drum 65 so that the notes are fed out from the point B where the surface of the drum 62 and the belt 61 diverge from one another. The drum 65 is rotating at a speed so that the linear velocity at its surface matches the linear velocity at the surface of drum 62. Thus, at the point B, the notes are travelling at this predetermined linear velocity and they are retained against the surface of the drum 65 after passing the point B by means of a curved guide 66.

When the leading edge of the first note reaches the point C it is positively urged against the surface of the drum 65 by means of a pressure roller 67. The distance B C is less than the length of each note. A further pressure roller 69 engages drum 65 at the point D and the distance C D is again less than the length of a note.

Finally the notes are picked up by a vacuum drum 68 spaced from drum 65 and rotating at a much higher speed. The distance DE is slightly greater than the length of a note so that the trailing edge of each note will just have moved out of engagement with pressure roller 69 when the note is picked up by drum 68. Moreover, the higher speed of drum 68 ensures that the trailing edge of the first note will have passed the point E before the leading edge of the second note reaches the point E, and so on. Each note is thereby extracted from the store without interfering with the following notes.

Figure 4:
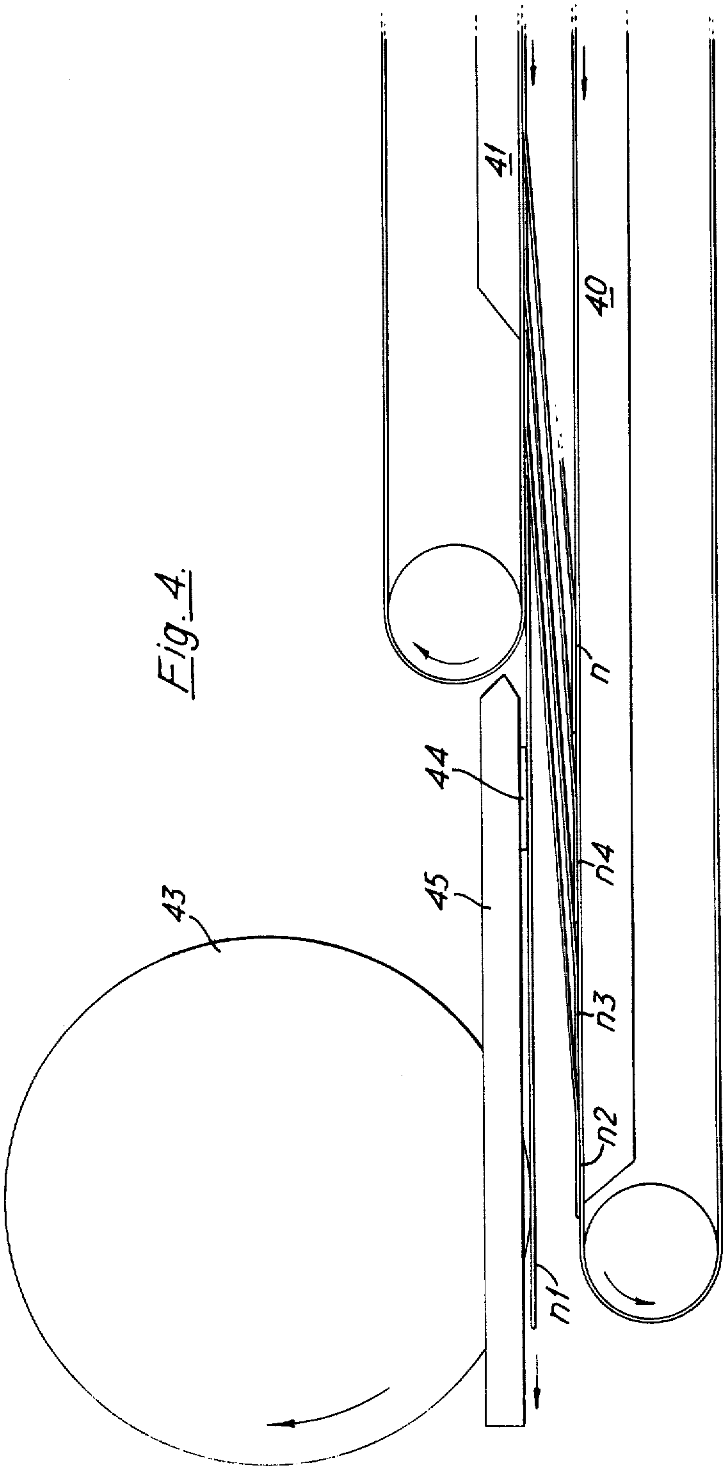
FIG. 4 is a diagrammatic side elevational view illustrating an alternative method of extracting sheets from a store similar to that shown in FIG. 3.

One alternative method of extracting notes from a buffer store in which the notes are layered one upon the other is illustrated in FIG. 4. In this arrangement the notes are sandwiched between a pair of perforated endless vacuum belts 40 and 41. A vacuum feed wheel 43 and a vacuum pad 44 combine to lift each sheet successively away from the vacuum belt 40 while a stripper plate 45 strips the trailing edge of the note away from the vacuum belt 41.

The wheel 43 rotates at a speed which moves the note *n*1 out of the store at about 10 times the speed at which the notes are being advanced by the belts 40 and 41. Thus as note *n*1 moves out, note *n*2 is initially picked-up by the pad 44 and then fed out by the wheel 43. The vacuum shoe behind belt 40 terminates at a position which enables the note *n*2 to move freely across to the feed-out position at the right time, the trailing edge of the note having already passed beyond the end of the vacuum shoe behind the belt 41.

Figure 5:
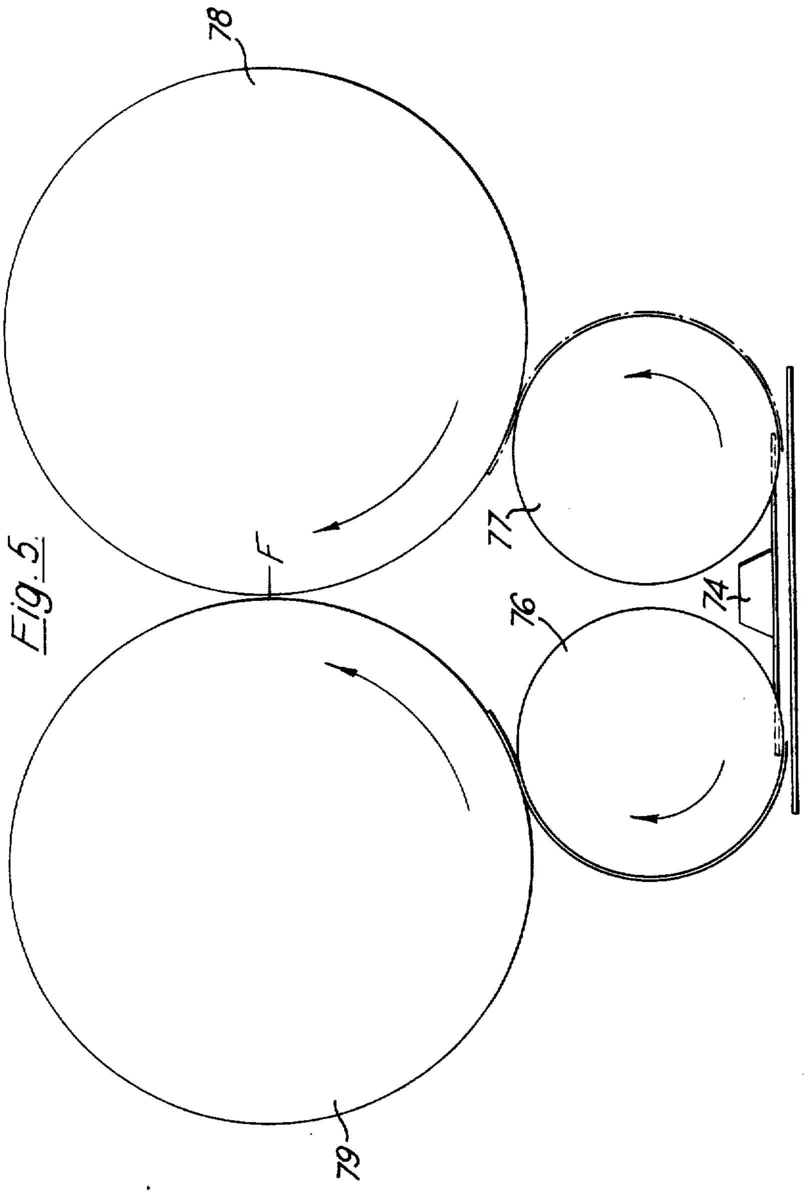
FIG. 5 is a plan view of a facing mechanism for use in the system of FIG. 1.

Once the notes have been fed out from any one of the stores shown in FIGS. 2 – 4, they are faced by the facer illustrated in FIG. 5 before being fed to the batch sorter 13 (FIG. 1). Referring now to FIG. 5, the notes are brought in turn to a position in which they lie adjacent a vacuum pad 74. A pair of vacuum drums 76 and 77 are positioned one on either side of the vacuum pad 74 and the two drums, when energised, rotate in opposite directions so that a note is transferred either to the vacuum feed drum 78 or to the vacuum feed drum 79. The two alternative feed paths then reunite at the point F where the drums 78 and 79 bear against one another. After passing the point E the notes are fed around the surface of the drum 79 to the batch sorter.

It can be seen that if a note is transferred to the drum 79 by means of the drum 76 the surface of the note which was resting against the vacuum pad 74 will now face outwardly from the drum 79 whereas if a note is transferred by means of the drum 77 the same surface will now face inwardly. The energisation of the drums 76, 77 is controlled by a signal from the shift register 31 (FIG. 1) which receives the signal indicating the direction in which the note is facing when it enters the buffer store 32. The signal fed into the register 31 is clocked through the register at the same rate as the corresponding note is advanced through the store 32 so that the signal representing the facing of the note arrives at the facer 33 at the same time as the note itself reaches the vacuum pad 74. If it is required to reverse the direction in which the note is facing, the signal from the register 31 will energise the vacuum supply for drum 76 while if the note is already facing in the correct direction the signal will energise the vacuum supply for drum 77. Thus the notes fed out from the facer around the periphery of the drum 79 are all facing in the same direction.

We claim:

1. A sheet feeding mechanism in which the sheets in a batch of sheets are to be sorted into different output stackers, comprising means for advancing the sheets along a given path, a buffer store for receiving and temporarily holding a batch of sheets fed along the path while a predetermined batch value is verified, a batch verifier responsive to the passage of each sheet along the path for comparing a measured batch value with a reference value to derive an error signal, means for extracting the sheets one by one from the store, and a sheet sorting mechanism for sorting the sheets extracted from the store into different output stackers, the sorting mechanism including means responsive to the output of the verifier for segregating the sheets of a batch extracted from the store whenever the error exceeds a predetermined value.

2. A sheet feeding mechanism according to claim 1 in which the buffer store includes an input station and an output station, a sheet conveying mechanism for conveying the sheets between the input station and the output station, means located at the input station for continuously loading the sheets one by one into the sheet conveying mechanism in such a manner that at least the leading edges of the sheets are separated from one another, the sheet extraction means being located at the output station and the sheets being conveyed continuously between the two stations in such a manner that the first sheet of a batch reaches the output station only after the last sheet of the batch has passed through the input station.

3. A sheet feeding mechanism according to claim 2 in which the sheet extraction means is operative at a speed exceeding the speed at which the sheets are conveyed between the input station and the output station whereby each sheet vacates the output station before the next succeeding sheet moves into the output station.

4. A sheet feeding mechanism according to claim 3 in which the sheet conveying mechanism includes a predetermined number of storage units each capable of retaining a single sheet, and in which the loading means located at the input station is so arranged that the sheets are loaded one by one into successive units as the units move through the input station.

5. A sheet feeding mechanism according to claim 4 in which the sheet conveying mechanism includes a drum rotatable about a fixed axis, each storage unit comprising a pocket extending radially from the drum and each pocket including means for releasably retaining a sheet in the pocket during rotation of the drum about the fixed axis.

6. A sheet feeding mechanism according to claim 2 in which the sheet loading means includes means for superimposing the sheets one behind the other in a partially overlapping formation, and the sheet conveying mechanism includes means for retaining the sheets in the partially overlapping formation during their passage between the input station and the output station.

7. A sheet feeding mechanism according to claim 2 in which the sheet extraction means includes means for engaging the leading edge of each sheet when the sheet is located at the output station and means for advancing the engaged sheet at a speed exceeding the speed at which the sheets are conveyed through the store, the excess speed of the engaged sheet being such that the trailing edge of the sheet will have passed beyond the point at which the sheet is initially engaged by the engaging means before the leading edge of the next succeeding sheet reaches the engagement means.

8. A sheet feeding mechanism according to claim 1 further comprising a facer for facing the sheets extracted from the buffer store, the facer including first and second sheet advancing means which, when energised, move a sheet along first and second paths respectively, the first path but not the second path reversing the direction in which the sheet is facing and the two paths subsequently uniting with one another, means for bringing each sheet in turn into a position where one end of the sheet is in engagement with the first sheet advancing means and the opposite end of the sheet is in engagement with the second sheet advancing means, and means responsive to a signal indicating the direction in which the sheet is facing for energising either the first or the second sheet advancing means such that only those sheets facing in the wrong direction are fed along the first path.

9. A sheet feeding mechanism in which the sheets in a batch of sheets are to be sorted into different output stackers, comprising means for advancing the sheets along a given path, a buffer store for receiving and temporarily holding a batch of sheets fed along the path while the number of sheets in each batch is verified, means for sensing the passage of each sheet along the path to derive a signal representing the number of sheets in each batch, a batch verifier for comparing the measured number of sheets in each batch with a reference value to derive an error signal, means for extracting the sheets one by one from the store, and a sheet sorting mechanism for sorting the sheets extracted from the store into different output stackers, the sorting mechanism including means responsive to the output of the verifier for segregating the sheets of a batch extracted from the store whenever the measured number of sheets in the batch differs from the reference value.

* * * * *